March 24, 1959 — F. H. WEBB — 2,878,867
TIME CONTROL DEVICE FOR WATER SOFTENING
Original Filed Dec. 30, 1952 — 3 Sheets-Sheet 1

INVENTOR.
FRANCIS H. WEBB
BY Frederick Diehl
ATTORNEY

March 24, 1959 F. H. WEBB 2,878,867
TIME CONTROL DEVICE FOR WATER SOFTENING
Original Filed Dec. 30, 1952 3 Sheets-Sheet 2

INVENTOR.
FRANCIS H. WEBB
Frederick Diehl
ATTORNEY

March 24, 1959 F. H. WEBB 2,878,867
TIME CONTROL DEVICE FOR WATER SOFTENING
Original Filed Dec. 30, 1952 3 Sheets-Sheet 3
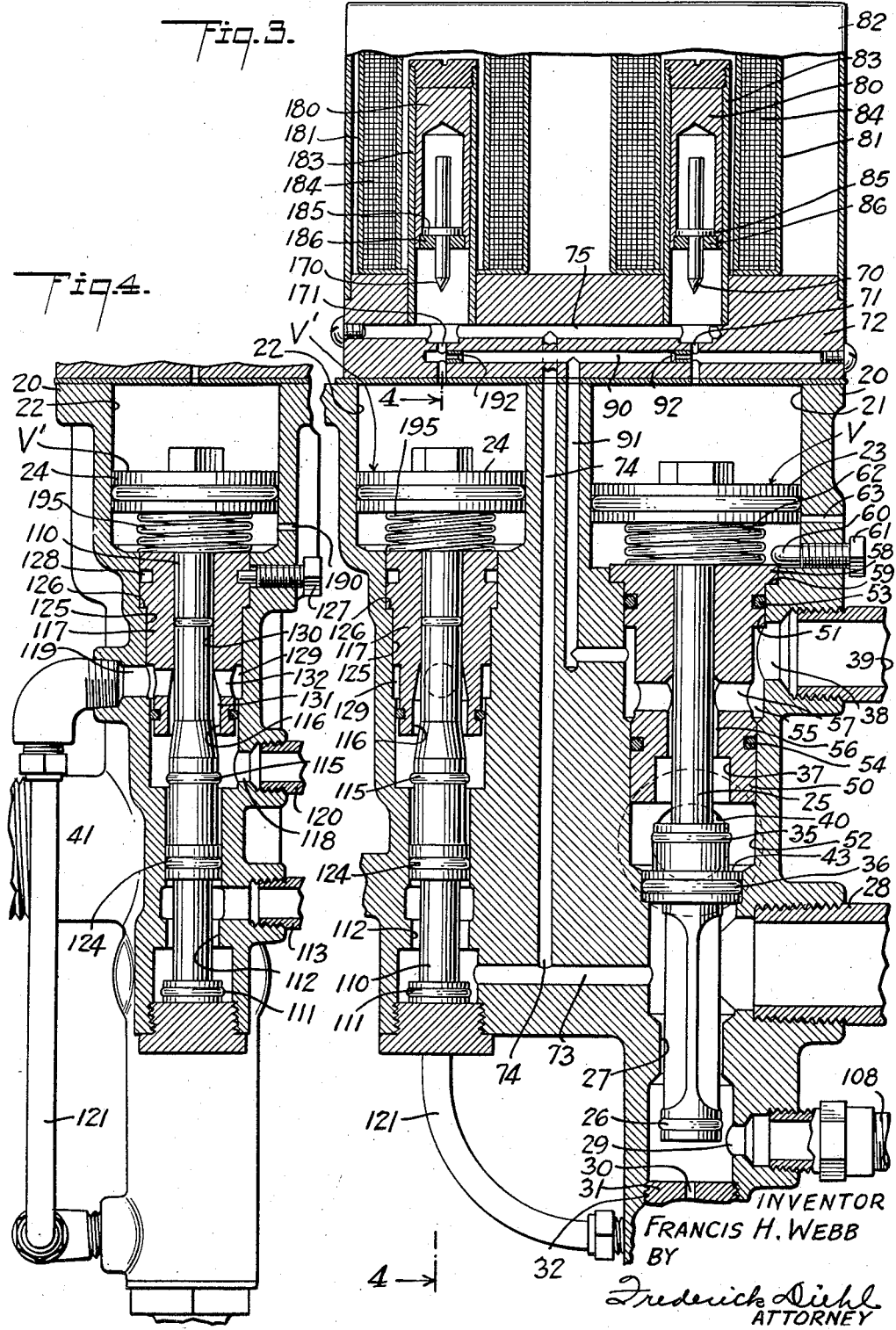
INVENTOR
FRANCIS H. WEBB
BY
Frederick Diehl
ATTORNEY

United States Patent Office 2,878,867
Patented Mar. 24, 1959

2,878,867

TIME CONTROL DEVICE FOR WATER SOFTENING

Francis H. Webb, Pasadena, Calif.

Original application December 30, 1952, Serial No. 328,584, now Patent No. 2,744,867, dated May 8, 1956. Divided and this application February 6, 1956, Serial No. 563,605

3 Claims. (Cl. 161—7)

This application is a division of my pending application Serial No. 328,584, filed December 30, 1952, now Patent No. 2,744,867, issued May 8, 1956.

My present invention relates to water softening apparatus of the general character embodied in my Patent No. 2,670,328, issued January 15, 1954, and wherein it is the object to provide an apparatus which is fully automatic to regenerate the exchanger bed at predetermined time intervals to insure a continuous supply of soft water; which embodies a pressurized and sealed brine tank eliminating the danger of overflowing and flooding the premises; which eliminates floats and float valves in the brine tank; which eliminates an injector to raise brine from the brine tank and deliver the brine to the exchanger bed; and which is quickly adjusted to regenerate at any desired time interval and has sufficient salt storage capacity to care for the needs of the average family for an entire year.

It is an object of my present invention to provide a water softening apparatus having all of the above stated advantages, and in addition is characterized structurally and functionally to completely isolate the brine tank from the softener tank except during regeneration, so as to obviate the possibility of salt water ever becoming mixed with the water in the service line.

It is a further object of my present invention to provide a water softening apparatus which is structurally characterized by its compactness and its improved functioning by means of a multi-port sealed brine valve element which is intimately associated both structurally and functionally with the main or master control valve element, and which is operated and controlled by an adjustable, automatic reset interval timer electrically driven to accurately predetermine the brine feeding period of the regenerating cycle, the brine valve element being free from any and all contamination by salt water which might adversely affect its operation.

With these and other objects in view, this invention resides in the combinations, arrangements and functional relationships of elements as set forth in the following specification and particularly pointed out in the appended claims.

In the accompanying drawings,

Figure 3 is a view similar to Figure 2 and showing the master and brine valve elements in regenerating position;

Figure 4 is a vertical transverse sectional view taken on the line 4—4 of Figure 3.

Referring specifically to the drawings, my invention in its present embodiment broadly comprises a softener tank S, a brine tank B, a master control valve element V, a brine valve element V', and electrical circuits controlling the elements V and V' and including a conventional program timing clock P and a conventional automatic reset interval timer T.

The softener tank S which may be of plastic lined sheet metal construction, is provided with a bottom layer of gravel 10 on which is placed a layer of filtering sand 11, above which latter is the exchanger bed preferably of "Zeolite." The brine tank B is of similar construction and is provided with a top filling opening adapted to be closed fluid-tight by a removable cap 13. The usual softener salt is supplied to the brine tank for mixing with sufficient water to form a saturated solution.

Figure 2:
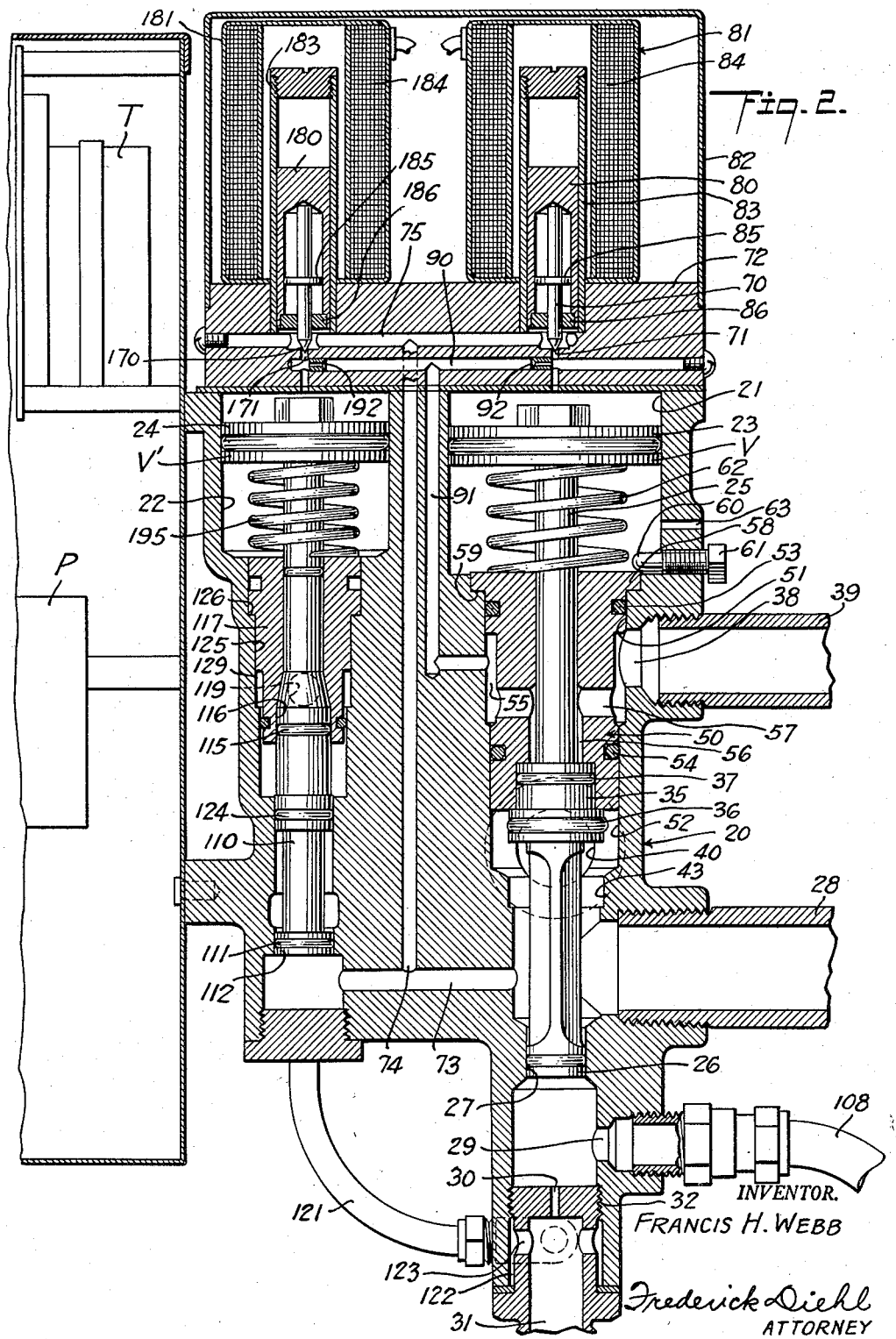
Figure 2 is a vertical longitudinal sectional view of the master and brine valve elements of the apparatus in service position.

The valve elements V and V' are intimately arranged both structurally and functionally in a single compact unit comprising a body 20, which is bored to provide hydraulic cylinders 21 and 22 disposed side by side in parallel relation and receiving reciprocable pistons 23 and 24 of the respective elements V and V' as clearly shown in Figures 2 and 3.

The piston 23 is fixed to one end of a stem 25, the other end of which latter has a valve 26, which, in the service position of the elements V and V' shown in Figure 2, has fluid sealing engagement with an annular seat 27 in the body 20 to disconnect a hard water inlet 28 from an outlet 29 and from a restricted orifice 30 in a nipple 31 screw threaded at 32 into the lower end of the body.

Figure 1:
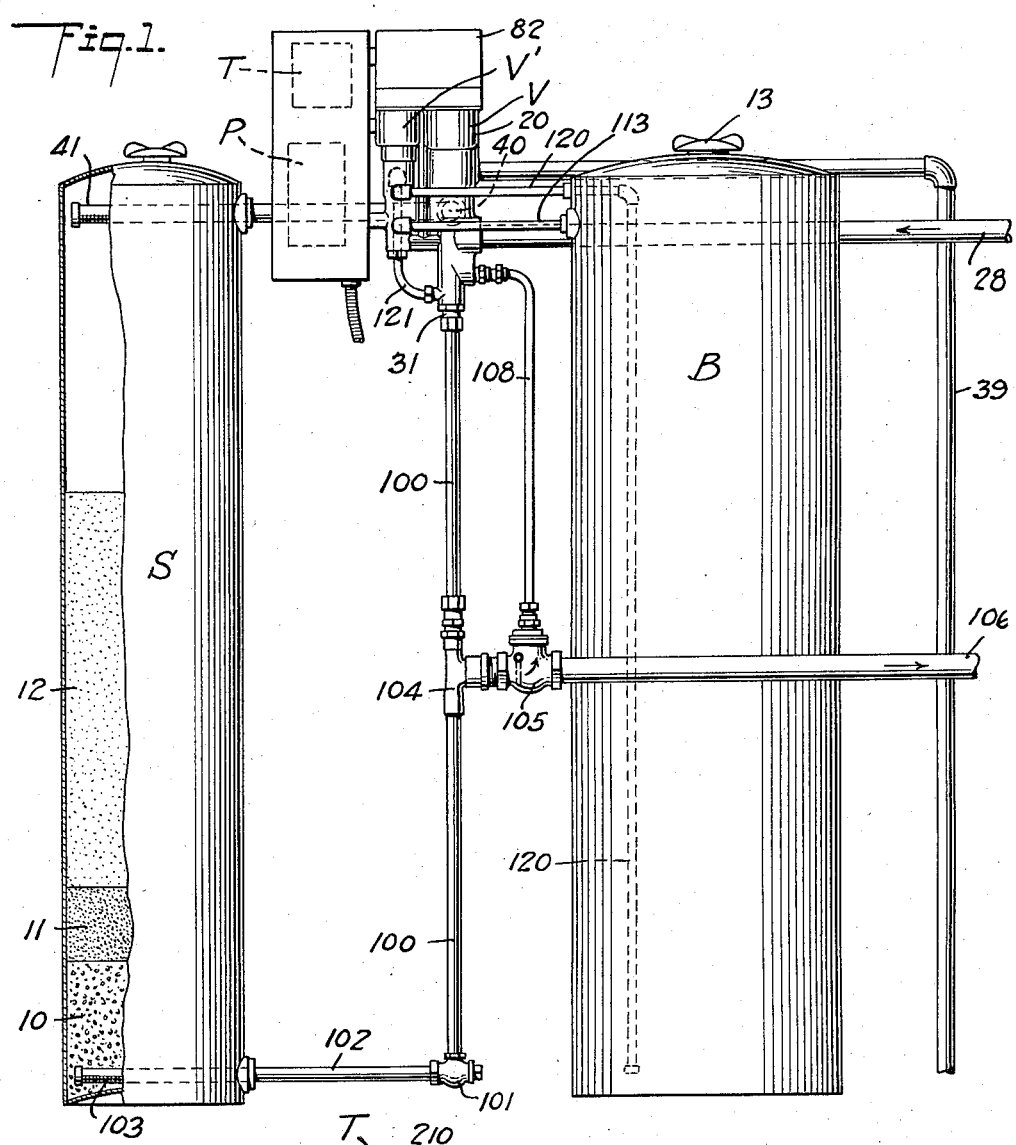
Figure 1 is a view in side elevation with parts in section, of one form of water softening apparatus embodying my present invention.

Intermediate the ends of the stem 25 are fixed valves 35 and 36, the former of which has fluid sealing engagement with an annular seat 37 in the service position of the master valve element V, so as to disconnect a drain port 38 of a drain pipe 39 from a port 40 which is placed in communication with the softener tank S near the top thereof by a perforate pipe 41 (Figure 1).

In the service position of the valve element V, the valve 36 is disengaged from an annular seat 43 in the body 20, so as to place the hard water inlet 28 in communication with the port 40 for the delivery of hard water to the top of the softener tank S through the pipe 41. The annular seat 37 is formed in a cylindrical seat member 50, the end portions of which fit snugly in cylindrical bores 51 and 52 in the body 20, and are provided with sealing rings 53 and 54. The central portion of the seat member 50 is reduced in diameter to provide an annular passage 55 in the body 20 opening to the drain port 38 and to the annular seat 37 by means of an annular passage 56 in the seat member surrounding the stem 25, all as clearly shown in Figures 2 and 3.

The seat member 50 is provided with an annular flange 58 which is held against an annular shoulder 59 in the body 20 by a removable pin 60 on the end of a screw 61 screwed into the body as shown in Figure 2. A coil spring 62 surrounds the stem 25 between the seat member 50 and the piston 23 to urge the valve element V to the service position shown in Figure 2. A breather port 63 is provided in the body 20 for the cylinder 21 to relieve same of pressure during movements of the piston 23.

Movement of the piston 23 to the regenerating position shown in Figure 4 is effected hydraulically under the control of an electrically operated needle valve 70 which normally gravitates to seal fluid-tight, an inlet port 71 formed in a head 72 closing the upper ends of the cylinders 21 and 22 and removably secured to the body 20. The inlet port 71 is placed in communication with the hard water inlet 28 through ducts 73 and 74 in the body and a duct 75 in the head 72, so that upon opening of the needle valve 70, water from the inlet 28 will flow into the cylinder 21 so as to act upon the piston 23, The needle valve 70 is mounted in the hollow core 80 of a solenoid 81 supported on the head 72 and enclosed in a cover 82 removably secured to the head. The core 80 is reciprocable freely in a tube 83 in the solenoid winding 84, and the needle valve 70 is provided with a stop flange 85 co-acting with a plug 86 in the end of the core 80 to provide a lost motion connection between the needle valve and core in a direction axially thereof. Thus, upon energization of the solenoid 81 the core will first be drawn into the tube 83 until the plug 86 engages the flange 85, whereupon the needle valve 70 will be jerked free of the port 71 to insure opening of the port for the flow of water into the cylinder 21 to effect movement of the piston 23 to its regenerating position shown in Figure 3.

A relief duct 90 in the head 72, communicating with a duct 91 in the body 20, connects the cylinder 21 with the drain port 38 through a restricted or bleed port 92 so as to permit water introduced into the cylinder to discharge therefrom into the drain pipe 39 when the needle valve 70 has been restored to its closed position, all so as to enable the piston 23 to return to its service position shown in Figure 2, under the action of the spring 62.

Current is supplied to the solenoid 81 to energize same at predetermined intervals when it is desired that regeneration be effected, and to maintain the solenoid energized for a predetermined time interval necessary to complete the brining and rinsing portions of a regenerating cycle, by operation of the program timing clock P whose micro switch 95 is placed in circuit with the solenoid through conductors 96 and 97 from a suitable source of current supply.

Connected to the nipple 31 is one end of a brine pipe 100, the other end of which is connected by a cleanout fitting 101 to a pipe 102 extending into the softener tank S close to the bottom thereof and being provided with a large number of ports 103. Intermediate its ends, the pipe 100 is provided with a T fitting 104 the lateral branch of which is connected through a check valve 105 to an outlet pipe 106 for delivering soft water to the service line.

By means of a pipe 108, the outlet 29 is placed in communication with the outlet pipe 106 through the body of the check valve 105 so as to provide a by-pass connection for the delivery of hard water from the supply pipe 28 to the service line during regeneration.

The piston 24 of the valve element V' is fixed to one end of a stem 110 to the other end of which is fixed a valve 111, which, in the service position of the valve elements shown in Figure 2, has fluid-sealing engagement with an annular seat 112 in the body 20, to disconnect the hard water inlet 28 from a pipe 113 leading to the top of the brine tank B (Figure 1).

Intermediate its ends the stem 110 is provided with a valve 115 which in the service position of the valve elements has fluid-sealing engagement with an annular seat 116 in a cylindrical seat member 117 slidably receiving the stem, to disconnect a brine inlet port 118 from a brine outlet port 119, the port 118 being in communication with the brine tank B at a point near the bottom thereof through a pipe 120, and the port 119 being in communication with the bottom of the softener tank S through a pipe 121. The pipe 121 leads from the port 119 to an annular chamber 122 surrounding the nipple 31 in the body 20 and in communication with the interior of the nipple below the restricted orifice 30 by means of radial ports 123 in the nipple. Between the valves 112 and 115 the stem 110 is provided with a sealing ring 124 to completely isolate the brine and water from each other to insure that no brine can enter the hard water inlet 28.

The seat member 117 is confined in a bore 125 in the body against an annular shoulder 126 therein, by a set screw 127 entering an annular groove 128 in the member. The seat member 117 is reduced in diameter between its sealed ends to form an annular passage 129 between the seat member and body, with which the port 119 directly communicates.

The end portion of the bore 130 of the seat member which receives the stem 110 is enlarged in diameter to provide an annular passage 131 containing the valve seat 116 and communicating at one end with radial ports 132 in the seat member opening into the annular passage 129. In the position of the valve element V' shown in Figures 3 and 4, the annular passage 131 is in communication with the port 118 so as to permit brine to flow therefrom to the pipe 121 as will be clear from Figure 4.

Movement of the piston 24 to the position shown in Figures 3 and 4 is effected hydraulically when the piston 23 is moved to regenerating position, under the control of an electrically operated needle valve 170. The valve 170 normally gravitates to seal fluid-tight an inlet port 171 formed in the head 72 and communicating with the hard water inlet 28 through the duct 75 which is common to both ports 71 and 171 as clearly shown in Figures 2 and 3, all so that upon opening of the needle valve 170, water from the inlet 28 will flow into the cylinder 22 so as to act upon the piston 24.

The needle valve 170 is mounted in the hollow core 180 of a solenoid 181 supported on the head 72 and also enclosed in the cover 82. The core 180 is reciprocable freely in a tube 183 in the solenoid winding 184, and the needle valve 170 is provided with a stop flange 185 co-acting with a plug 186 in an end of the core 180 to provide a lost motion operative connection between the needle valve and core functioning in the same manner as with the previously described needle valve 70.

The relief duct 90 in the head 72 is extended to communicate with the port 171 through a restricted or bleed orifice 192 so as to permit water introduced into the cylinder 22 to discharge therefrom into the drain pipe 39 when the needle valve 170 has been restored to its closed position, all so as to enable the piston 24 to return to its service position shown in Figure 2, under the action of a coil spring 195 surrounding the stem 110 and interposed between the seat member 117 and the piston 24.

Current is supplied to the solenoid 181 through conductors 196 and 197 to energize the solenoid during a predetermined brining portion of the regenerating cycle, under the control of the interval timer T having a micro switch 200. The solenoid is maintained deenergized during the following rinsing portion of the regenerating cycle by the interval timer T which then completes a circuit through conductors 201 and 202 to energize a holding coil 203 which maintains the circuit to the solenoid 181 broken as will be more fully described in the operation of the invention which is as follows:

With the valve elements V and V' in the service position shown in Figure 2, hard water from the usual domestic source of supply will be free to flow through the inlet 28 past the open valve 36 and through the outlet port 40 and pipe 41 into the top of the softener tank S, then downwardly through the exchanger bed 12, sand 11 and gravel 10, so as to be rendered soft by the chemical action of the bed 12, then through the pipes 103, 100, T fitting 104 and check valve 105 to the soft water service pipe 106.

As an example, let it be assumed that the program timing clock P has been set for regeneration of the softener tank S one a week, say at 2.00 a.m. on Sunday, and that the regeneration period is forty-five minutes which has been based on the hardness of the water in the area drawn from, as well as on the amount of water used on the premises. Furthermore, let it be assumed that the automatic reset timer T has been set for a predetermined length of brining period such as five minutes at the beginning of regeneration.

Figure 5:
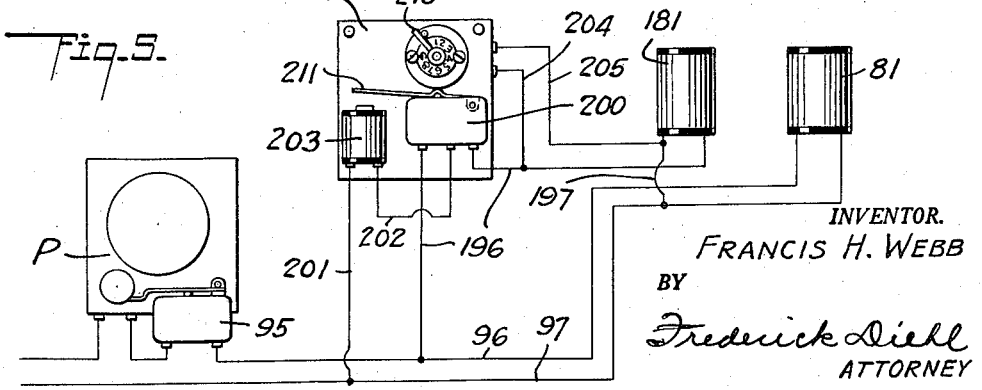
Figure 5 is a diagrammatic view of the electrical circuits embodied in the water softening apparatus.

When regeneration time arrives, the clock P closes the current supply circuit through the micro switch 95 to energize the solenoid 81 through conductors 96 and 97 and to energize the solenoid 181 through the conductors 196, 197 and the micro switch 200 of the timer T, as well as to start the clock of the timer T through conductors 204 and 205 (Figure 5).

Upon energization of the solenoids 81 and 181, their respective needle valves 70 and 170 will be jerked open to enable water from the inlet 28 to flow through ducts 73, 74 and 75 and ports 71 and 171 into the respective cylinders 21 and 22 so as to act upon the pistons 23 and 24 and move same against their springs 62 and 195, thus moving the valve elements V and V' to the regenerating position, all as shown in Figure 3.

The valve 36 is now closed, thus discontinuing the supply of hard water to the top of the softener tank S, whereas the valve 111 is now open so that water from the inlet 28 is free to flow through the duct 73, pipe 113 into the top of the brine tank B. Hard water for use on the premises is now available from the inlet 28, pipe 108 and pipe 106 (Figures 1 and 3).

The brine tank is thus placed under pressure so as to force brine upwardly through the pipe 120 past the open valve 115, through pipe 121, nipple 31, pipes 100 and 102 into the bottom of the softener tank S so as to be forced successively through the gravel 10, sand 11 and the exchanger bed 12. The flow of brine is accelerated by the high velocity jet of water discharging from the restricted orifice 30 of the nipple 31. Water in the softener tank in advance of the incoming brine is forced thereby through the pipe 41, port 40, annular passage 56, radial ports 57, annular passage 55, drain port 38 into the drain pipe 39.

When the interval for which the time has been set has elapsed, the trip arm 210 of the timer actuates the spring armature blade 211 of the micro switch 200 to open the circuit to the brine solenoid 181 through the conductors 196 and 197, and to stop driving the clock mechanism of the timer. The micro switch 200 now functions to complete a circuit to the holding coil 203 through the conductors 201 and 202 so that the coil will co-act with the armature blade 211 in maintaining the solenoid deenergized during the remainder of the regenerating cycle, while the timer T will be free to automatically reset.

The needle valve 170 gravitates to its closed position with respect to the port 171, thus rendering the spring 195 free to restore the piston 24 to its position shown in Figure 2, as water in the cylinder 24 is forced therefrom by the piston past the restricted port 192, ducts 90, 91, annular passage 55, and port 38 to the drain pipe 39.

The flow of water to the brine tank and the flow of brine to the softener tank S are now discontinued, and the rinsing of brine from the softener tank is started so as to remove calcium chloride which has been displaced by the sodium chloride solution. This rinsing is accomplished by the continued flow of water through the restricted orifice 30 of the nipple 31, and is calculated to flow through the softener tank at the rate of approximately one and three-quarter gallons per minute until the regenerating period has elapsed.

The program clock P now breaks the circuit to the solenoid 81 and to the holding coil 203, thus permitting the armature blade 211 of the timer T to return to its normal position, and permitting the needle valve 70 to gravitate to its closed position with respect to the port 71. The spring 62 is now free to act in restoring the piston 23 to its service position as water in the cylinder 21 is forced therefrom through the restricted orifice 92, ducts 90 and 91, passage 55, port 38 and drain pipe 39. The closing of the valve 35 discontinues the flow of water from the softener tank S through the pipe 41 into the drain pipe 39, whereas the opening of the valve 36 will again deliver hard water from the inlet 28 to the softener tank through the pipe 41. As the valve 26 is now closed, the flow of rinsing water to the bottom of the softener tank through the orifice 30 is also discontinued.

The apparatus is now ready to deliver soft water to the service line until the next regenerating period arrives. The brine tank B is also relieved of pressure so that salt may be added at any time during service of the apparatus.

By the provision of the brine valve element V' and its structural and functional relationship to the master valve elevent V in a single compact unit, positive and synchronized operation of the valve elements as well as the complete isolation of the brine from the service line is assured. Furthermore, the construction of the brine valve element V' and the manner in which the brine is conducted therethrough eliminates the corrosive and contaminating effect of brine upon delicate working parts, and insures highly efficient, service-free operation of the apparatus indefinitely.

I claim:

1. Time controlled mechanism for master and brine valve elements of water softening apparatus comprising: two operating devices for the valve elements; electrical circuits including a time clock having a switch; an interval timer having a switch and a holding device therefor; means operatively connecting both of said operating devices and switches, through which current is supplied to both of said operating devices through said switches at a predetermined time for which said time clock is set; and means operatively connecting the holding device and interval timer, through which current is supplied to the holding device upon opening of the interval timer switch, to hold the interval timer switch open and disrupt the circuit thereat to the respective one of said operating devices.

2. Time controlled mechanism for master and brine valve elements of water softening apparatus comprising: two electromagnetic operating devices, one for each of the valve elements; electrical circuits including a time clock having a switch; an interval timer having a switch and a holding device therefor; means operatively connecting both of said operating devices and switches, through which current is supplied to both operating devices through the first and second said switches at a predetermined time for which said time clock is set; and means operatively connecting said holding device and interval timer, through which current is supplied to the holding device upon opening of the interval timer switch, to hold the latter open and disrupt the circuit thereat to one of said operating devices.

3. Time controlled mechanism for master and brine valve elements of water softening apparatus comprising: two electromagnetic operating devices, one for each of said valve elements; electrical circuits including a time clock having a switch; an interval timer having a switch and a holding coil; means operatively connecting both of said operating devices and switches, through which current is supplied to both operating devices through the first and second said switches at a predetermined time for which said time clock is set; and means operatively connecting the holding coil and interval timer, through which current is supplied to the holding coil upon opening of the interval timer switch, to hold the interval timer switch open and disrupt the circuit thereat to the respective one of said operating devices.

References Cited in the file of this patent

UNITED STATES PATENTS

| | | |
|---|---|---|
| 1,910,011 | Griswold et al. | May 23, 1933 |
| 2,265,225 | Clark | Dec. 9, 1941 |
| 2,596,915 | Pick | May 13, 1952 |
| 2,631,665 | Perrin | Mar. 17, 1953 |
| 2,636,560 | Rogers | Apr. 28, 1953 |
| 2,689,218 | Waugh | Sept. 14, 1954 |